United States Patent [19]
Okamoto et al.

[11] Patent Number: 4,962,993
[45] Date of Patent: Oct. 16, 1990

[54] FIBRE-TYPE LIGHT CONVERSION DEVICE

[75] Inventors: Sota Okamoto; Kiyofumi Chikuma, both of Saitama, Japan

[73] Assignee: Pioneer Electronic Corporation, Tokyo, Japan

[21] Appl. No.: 357,819

[22] Filed: May 30, 1989

[30] Foreign Application Priority Data

Nov. 2, 1988 [JP] Japan ............... 63-278201

[51] Int. Cl.$^5$ ............... G02F 1/35
[52] U.S. Cl. ............... 350/96.29; 307/430; 307/427; 350/96.15
[58] Field of Search ............... 307/425–430; 350/96.15, 96.16, 96.29, 96.30, 96.34

[56] References Cited

U.S. PATENT DOCUMENTS

| | | | |
|---|---|---|---|
| 4,272,694 | 6/1981 | Jacobs | 307/427 |
| 4,331,891 | 5/1982 | Rizzo | 307/427 |
| 4,617,666 | 10/1986 | Liu | 307/427 X |
| 4,784,450 | 11/1988 | Jain et al. | 350/96.15 |
| 4,859,876 | 8/1989 | Dirk et al. | 307/425 |
| 4,874,221 | 10/1989 | Ohsawa | 350/96.29 |
| 4,909,596 | 3/1990 | Okazaki et al. | 350/96.29 |

FOREIGN PATENT DOCUMENTS 61-50122 3/1986 Japan .

*Primary Examiner*—John D. Lee
*Attorney, Agent, or Firm*—Foley & Lardner, Schwartz, Jeffery, Schwaab, Mack, Blumenthal & Evans

[57] ABSTRACT

A fibre-type light conversion device comprises a fibre-type light conversion element for converting the wavelength of an incident light and an optical system which introduces a light beam from a light source to the light conversion device as the incident light. The optical system is provided with a phase-shifting device which rotates the plane of polarization of the incident light. With this provision it is possible to set the efficiency of light conversion at a maximum level without necessity of rotating the light conversion element.

6 Claims, 1 Drawing Sheet

LIGHT SECOND HARMONIC WAVE RING

FIBRE-TYPE LIGHT CONVERSION DEVICE

BACKGROUND OF THE INVENTION

1. Field of the Invention

The present invention relates to a fibre-type light conversion device.

2. Description of Background Information

An optical pickup is known by which high density writing and reading of information on and from a disc are enabled by changing the wavelength of a laser beam emitted from a laser source to a half the original wavelength by means of a light conversion device (reference is directed to Japanese Patent Application Laid-Open No. 61-50122).

As the light conversion device for use in this type of pickup, there is an optical fibre-type SHG (Second Harmonics Generator) using a second-order non-linear optical effect. A phase matching, of (Cerenkov radiation system, is adopted in the optical fibre type SHG. With this system, it is possible to generate a second harmonic wave (referred to as SH wave hereinafter) whose phase matching condition is attained almost automatically. The general concept of this device is shown in FIGS. 1A and 1B.

In FIG. 1A, when the fundamental wave mode is propagated through the core with the effective reflective index of $N(\omega)$, the non-linear polarizing wave generating the SH wave is also propagated at the same phase velocity $C/N(\omega)$ (C is the speed of light). It is assumed that this non-linear polarizing wave produces the SH wave in a direction making an angle $\theta$ with respect to the direction of the wave guide at a point A, and generates the SH wave at the angle $\theta$, as before, at a point B, after the elapse of a unit time. If the SH wave generated at the point A propagates through the cladding and reaches point C after the elapse of the unit time, and the angle $\theta$ is such that lines AC and BC are perpendicular to each other, then the plane of the SH wave which is generated from the non-linear polarized wave between A and B becomes equal to BC, and as a result, a coherent SH wave is generated.

The condition of the phase matching is, according to the figure, as follows:

$$N(\omega) = N_{clad}(2\omega) \cos\theta \quad (1)$$

where $N_{clad}(2\omega)$ is the refractive index of the clad for the SH wave.

This in turn gives, $$N(\omega) < N_{clad}(2\omega) \quad (2)$$

The above equation means that the SH is generated automatically in the direction where the phase matching is performed when at least the condition mentioned by the equation (2) is satisfied. Generally, with the refractive indices of the clad and core for the fundamental wave being $n_{clad}(\omega)$ and $n(\omega)$ and with air as the overlayer, the condition for the fundamental wave to propagate through the core as a mode is expressed as follows:

$$N_{clad}(\omega) < N(\omega) < n(\omega) \quad (3)$$

Wavelength dispersion of the clads, refractive index will now be considered. Since $n_{clad}(\omega) < n_{clad}(2\omega)$, the equation (2) is satisfied for all of the fundamental wave modes irrespectively of the diameter of the core so far as the following expression (4) is satisfied.

$$N_{clad}(\omega) < N(\omega) < n_{clad}(2\omega) \quad (4)$$

Moreover, there are fundamental modes satisfying the equation (2) in a certain range of the diameter of the core even under the following condition.

$$N_{clad}(\omega) < n_{clad}(2\omega) < n(\omega)$$

The second harmonic wave generated in this way is propagated in a clad mode as illustrated in FIG. 1B in which total reflection occurs repeatedly at the boundary between the clad and air. Then, the second harmonic wave is emitted in conical shape from the end of fibre in directions making an angle $\theta$ relative to the fibre's direction. The equiphase front of the second harmonic wave emitted in this way is in a conical surface with an axis on the central axis of the fibre.

As a light source for this fibre-type SHG, a laser beam is utilized for example, and the laser beam is derived as an incidental light beam through an optical system consisting of a plurality of lenses. Since the non-linear sensitivity of the non-linear optical crystal in the core relates to the efficiency of the generation of the SH wave in the case of the fibre-type SHG, it is necessary to set the non-linear optical crystal so that its non-linear polarization generated by the non-linear sensitivity of the non-linear light is optimized with respect to the light beam from light source having a definite polarization. Therefore, conventionally, the direction of the non-linear optical crystal is determined to optimize the non-linear polarization generated by the non-linear sensitioity of the non-linear crystal by rotating the fibre-type SHG around its optical axis.

However, as a result of the rotation of the fibre-type SHG, errors in alignments such as the center of rotation (the position of the core) are likely to be generated each the fibre-type SHG is rotated. Therefore it has been difficult to set the direction of the fibre-type SHG at a direction in which a maximum efficiency is obtained.

OBJECT AND SUMMARY OF THE INVENTION

Therefore, an object of the present invention is to provide a fibre-type light conversion device which is configured so that the maximum efficiency in generation of the SH wave is easily attained.

The fibre-type light conversion device according to the present invention has a construction in which a phase shifting means for rotating the plane of polarization of the light beam is provided in the optical system which guides the light beam from the light source to the fibre-type SHG for converting the wavelength of the incident light beam.

DETAILED DESCRIPTION OF THE PREFERRED EMBODIMENT

The preferred embodiment of the present invention will be explained with reference to the accompanying drawing hereinafter.

Figure 1A:
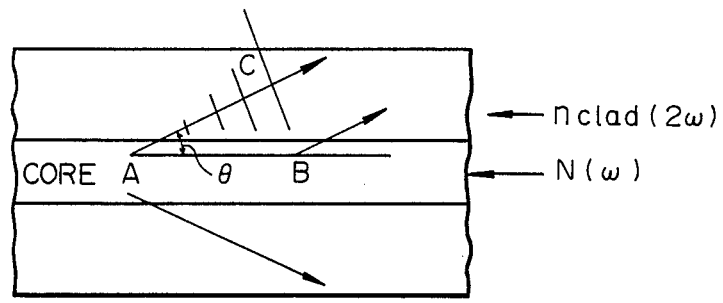
FIGS. 1A and 1B are diagrams for explaining the concept of the Cerenkov radiation system phase matching SHG.
Figure 1B:
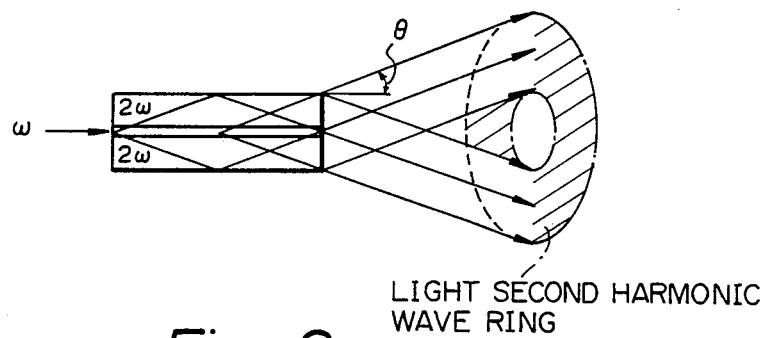
Figure 2:
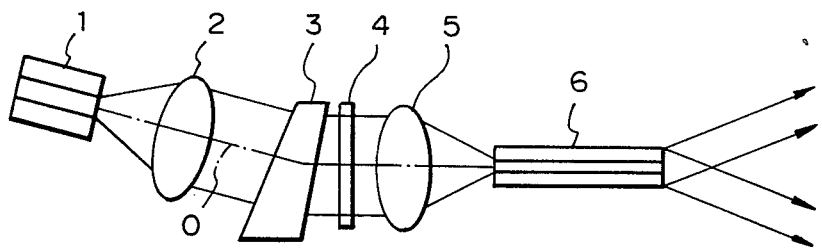
FIG. 2 is a diagram showing an embodiment of the fibre-type light conversion device according to the present invention.

In FIG. 2, a light beam emitted in a divergent manner from a light source 1 such as a laser diode is converted to a parallel light beam by means of a condenser lens 2, and is incident on a beam shaping prism 3. The beam shaping prism 3 is operative to converge the light beam so that the shape of a resultant beam spot approximates a circular form. The beam shaped by the beam shaping prism 3 is incident on a λ/2 (half wavelength) plate 4 operating as phase shifting means. The λ/2 plate 4 is provided in such a manner that it is rotatable about its optical axis 0, and operative to rotate the plane of polarization of the light beam with the rotation thereof. The light beam whose plane of polarization is determined by the λ/2 plate 4 is converged as it passes through a convergent lens 5, and incident on the fibre-type SHG 6. Within this fibre-type SHG 6, the generation of the SH wave relates to the magnitude of the non-linear polarization generated by the non-linear sensitivity of the non-linear optical crystal as described above.

In this structure, the rotational position of the λ/2 plate 4 is determined by its rotation so that the non-linear sensitivity of the non-linear optical crystal in the core is raised to a maximum level, attaining the maximum efficiency of generation of the SH wave. More specifically, the distribution of electric field of the primary light approaches the distribution of the electric field of the light derived by the fibre through this operation. In this way, the light beam is introduced into the core at higher efficiency, and the efficiency of generation of the SH wave attains the highest value.

As described in the foregoing, the light conversion device according to the present invention features the structure in which a phase-shifting means, which causes the rotation of the plane of polarization of the light beam, is disposed in the optical system introducing the light beam from the light source to the fibre-type SHG. Thus, according to the present invention it has been made possible to attain the maximum efficiency of generation of the SH wave without rotating the fibre-type SHG, with the facility of the setting procedure.

What is claimed is:

1. A fiber light conversion system, comprising:
   a fiber light conversion element having a non-linear optical crystal core therein for converting the wavelength of an incident light beam;
   a light house; and
   means for introducing the light beam from the light source to the wavelength conversion element as the incident light beam, the means including a rotatable phase shifter for rotating the plane of polarization of the incident light beam, the degree of rotation being selected to maximize the non-linear polarization generated by the non-linear sensitivity of the fiber element crystal core.

2. The system of claim 1, wherein the phase shifting means is a λ/2 plate rotatable about its optical axis.

3. The system of claim 2, further including a beam shaping prism positioned between the plate and the light conversion element for shaping the incident light beam.

4. A fiber light conversion system, comprising:
   a light source;
   a condenser for converting light from the light source to a parallel light beam;
   a beam shaping prism for converting the beam from the condenser to a beam of circular configuration;
   a λ/2 phase shifter for phase shifting the beam;
   a lens for converging the beam provided from the phase shifter; and
   a light conversion device for receiving the converged beam from the converging lens.

5. The system of claim 4, wherein the light conversion device is a second harmonic generator.

6. A method for converting the wave length of a light beam, including the steps of:
   generating a light beam to be converted;
   condensing the beam to a parallel configuration;
   shaping the parallel beam to a circular configuration;
   phase shifting the beam;
   converging the phase shifted beam; and
   applying the beam to a fiber light converging element.

* * * * *